US012676358B2

(12) United States Patent
Ariga

(10) Patent No.: US 12,676,358 B2
(45) Date of Patent: Jul. 7, 2026

(54) BATTERY MODULE

(71) Applicant: HONDA MOTOR CO., LTD., Tokyo (JP)

(72) Inventor: Toshiyuki Ariga, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 684 days.

(21) Appl. No.: 18/163,886

(22) Filed: Feb. 3, 2023

(65) Prior Publication Data

US 2024/0106022 A1 Mar. 28, 2024

(30) Foreign Application Priority Data

Mar. 29, 2022 (JP) ................................. 2022-054644

(51) Int. Cl.
*H01M 10/643* (2014.01)
*H01M 10/04* (2006.01)
*H01M 50/10* (2021.01)
*H01M 50/20* (2021.01)

(52) U.S. Cl.
CPC ..... *H01M 10/643* (2015.04); *H01M 10/0422* (2013.01); *H01M 10/0431* (2013.01)

(58) Field of Classification Search
CPC . H01M 10/643; H01M 10/0422; H01M 50/20
See application file for complete search history.

(56) References Cited

U.S. PATENT DOCUMENTS

| | | | |
|---|---|---|---|
| 2008/0113262 A1* | 5/2008 | Phillips ............... | H01M 10/482 |
| | | | 429/149 |
| 2010/0203367 A1* | 8/2010 | Che ..................... | H01M 50/169 |
| | | | 429/61 |
| 2012/0251854 A1 | 10/2012 | Kusama et al. | |
| 2016/0254687 A1* | 9/2016 | Tanaka ................ | H01M 10/425 |
| | | | 320/112 |
| 2019/0305395 A1* | 10/2019 | Favaretto .......... | H01M 10/6556 |
| 2020/0168962 A1* | 5/2020 | Schlunke .................. | B32B 3/08 |

FOREIGN PATENT DOCUMENTS

JP 2011134641 A 7/2011

* cited by examiner

*Primary Examiner* — Kenneth J Douyette
(74) *Attorney, Agent, or Firm* — CKC & Partners Co., LLC

(57) ABSTRACT

Provided is a battery module including a plurality of cylindrical solid batteries, each cylindrical solid battery having a shaft member, and a wound electrode group in which an electrode laminate of a positive electrode and a negative electrode laminated via an electrolyte is wound around the shaft member, the shaft member being provided with an NTC thermistor or a CTR thermistor in an axial direction between a first conductive member and a second conductive member, and having a through hole in its center, each cylindrical solid battery further having a temperature controller that is disposed in the through hole and controls the temperature of the NTC thermistor or CTR thermistor.

3 Claims, 2 Drawing Sheets

100

10

BATTERY MODULE

This application is based on and claims the benefit of priority from Japanese Patent Application No. 2022-054644, filed on 29 Mar. 2022, the content of which is incorporated herein by reference.

BACKGROUND OF THE INVENTION

Field of the Invention

The present invention relates to a battery module.

Related Art

In recent years, research and development of secondary batteries that contribute to energy efficiency have been carried out to ensure access to affordable, reliable, sustainable, and advanced energy for many people.

Patent Document 1 discloses a battery including a cylindrical shaft core having a shaft bore extending in the axial direction, and a wound electrode in which a first electrode plate, a second electrode plate, and a separator are wound around the outer periphery of the shaft core. The shaft bore is used as a path for discharging gas to the outside when the internal pressure of the battery rises and the safety valve opens.

Patent Document 1: Japanese Unexamined Patent Application, Publication No. 2011-134641

SUMMARY OF THE INVENTION

However, there has been a desire to improve the safety of all-solid batteries.

An object of the present invention is to provide a battery module that can improve the safety of all-solid batteries.

An embodiment of the present invention is a battery module including a plurality of cylindrical solid batteries, each cylindrical solid battery having a shaft member, and a wound electrode group in which an electrode laminate including a positive electrode and a negative electrode laminated via an electrolyte is wound around the shaft member, the shaft member being provided with an NTC thermistor or a CTR thermistor in the axial direction between a first conductive member and a second conductive member, and having a through hole in its center, each cylindrical solid battery further having a temperature controller that is disposed in the through hole and controls the temperature of the NTC thermistor or CTR thermistor.

Each cylindrical solid battery may further have, in the through hole, a detector that detects the state of the cylindrical solid battery.

Each cylindrical solid battery may have a first fastener provided at one end of the shaft member in the axial direction, and a second fastener provided at the other end of the shaft member in the axial direction, and adjacent cylindrical solid batteries may be fastened through the first fastener and the second fastener.

In the electrode laminate, the positive electrode and the negative electrode may be laminated via a solid electrolyte layer.

According to the present invention, a battery module that can improve the safety of all-solid batteries can be provided.

DETAILED DESCRIPTION OF THE INVENTION

An embodiment of the present invention will be described below with reference to the drawings.

Figure 1:
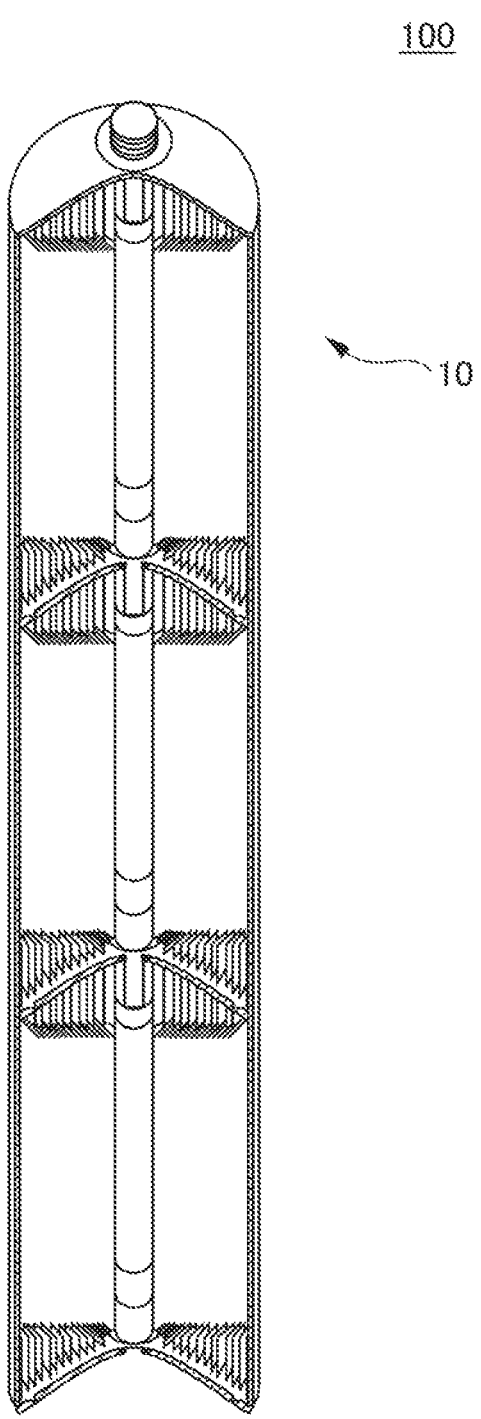
FIG. 1 is a partially cutaway perspective cross-sectional view showing an example of the battery module of the present embodiment.
Figure 2:
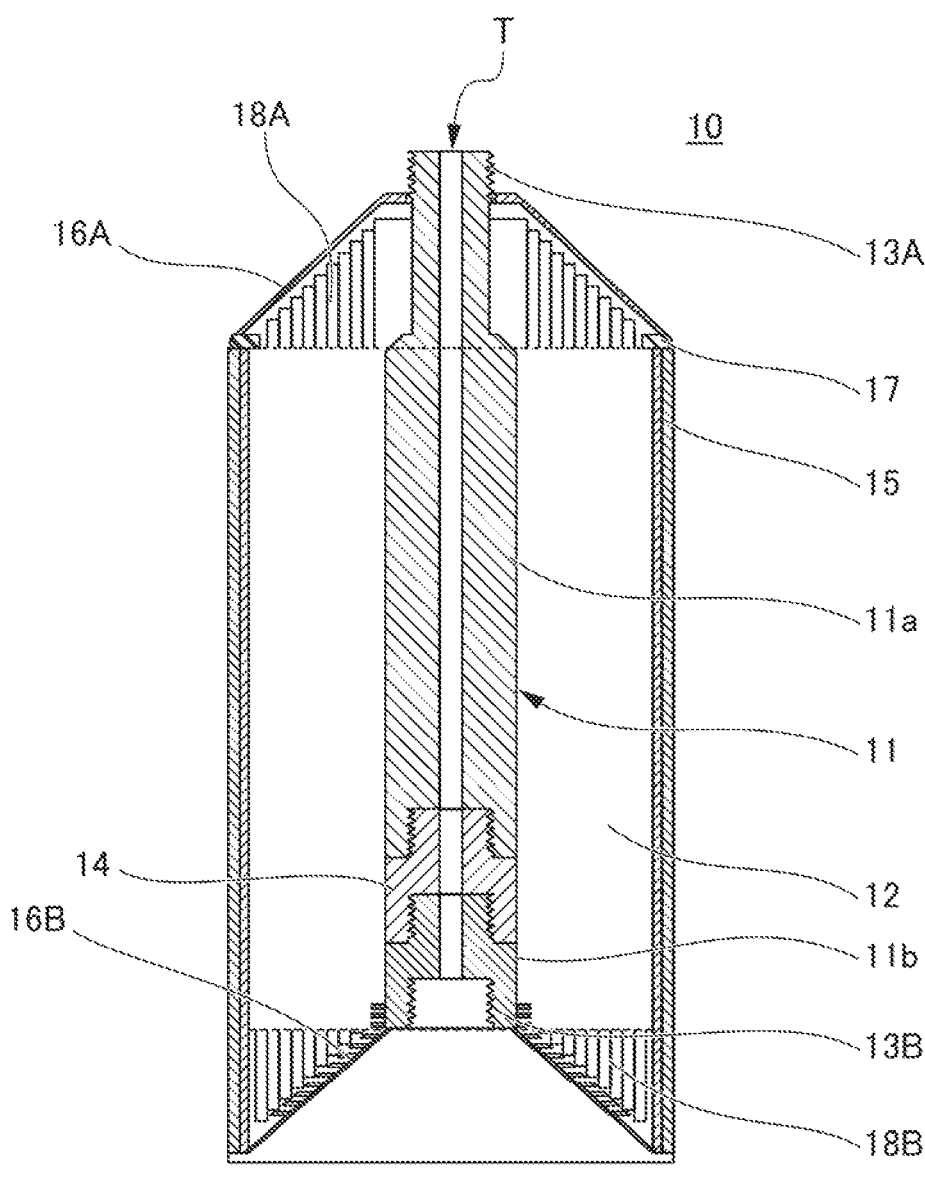
FIG. 2 is a cross-sectional view showing the cylindrical solid battery of FIG. 1.

FIG. 1 shows an example of the battery module of the present embodiment. Further, FIG. 2 shows the cylindrical solid battery of FIG. 1.

A battery module 100 includes a plurality of cylindrical solid batteries 10. Each cylindrical solid battery 10 has a shaft member 11, a wound electrode group 12 in which an electrode laminate including a positive electrode and a negative electrode laminated via an electrolyte is wound around the shaft member, a male thread 13A as a first fastener provided at one (upper) end of the shaft member 11 in the axial direction, and a female thread 13B as a second fastener provided at the other (lower) end of the shaft member 11 in the axial direction. In the battery module 100, the adjacent cylindrical solid batteries 10 are connected through the male thread 13A and the female thread 13B.

In this case, the male thread 13A is integrally molded with the shaft member 11. Therefore, the strength against rotational torque is increased when fastening the male thread 13A and the female thread 13B. The male thread 13A is electrically connected to one of the positive electrode and negative electrode, and the female thread 13B is electrically connected to the other of the positive electrode and the negative electrode.

The first fastener may be a female thread, and the second fastener may be a male thread.

The shaft member 11 is provided with an NTC thermistor 14 in the axial direction between a first conductive member 11$a$ and a second conductive member 11$b$, and has a through hole T in its center. The cylindrical solid battery 10 further has a temperature controller that is disposed in the through hole T and controls the temperature of the NTC thermistor 14. Therefore, if the cylindrical solid battery 10 is in an abnormal state (e.g., high voltage), the temperature controller heats the NTC thermistor 14 to reduce the resistance of the NTC thermistor 14 to make conduction. As a result, the voltage of the high-voltage cylindrical solid battery 10 becomes the same as that of the conducted cylindrical solid battery 10, and the voltage is reduced.

On the same principle as above, in the production of the battery module 100, the cylindrical solid batteries 10 are connected, and the temperature controller then heats the NTC thermistor 14 to reduce the resistance of the NTC thermistor 14 to make conduction, thereby eliminating the variation of voltage between the cylindrical solid batteries 10.

In the cylindrical solid battery 10, the temperature controller may cool the NTC thermistor 14. This can return the heated NTC thermistor 14 to the state before heating.

The temperature controller is not particularly limited, and examples include water-cooled cooling devices, air-cooled cooling devices, metals, heat pipes, and other electric heating materials, and heating devices in which a heating resistor is installed on a circuit. Two or more of these may be used in combination. Further, examples of heating devices include, but are not particularly limited to, devices with circuits in which coiled heating wires, ceramic resistors, and PTC heater elements are installed.

In this case, the NTC thermistor 14 is fastened with the first conductive member 11$a$ and the second conductive member 11*b*. Due to this, an insulating member 17, described later, is compressed, thereby improving the sealability of the cylindrical solid battery 10. The first conductive member 11*a* is provided with a female thread at the lower end in the axial direction. The NTC thermistor 14 is provided with a male thread at the upper end in the axial direction, and a female thread at the lower end in the axial direction. Further, the second conductive member 11*b* is provided with a male thread at the upper end in the axial direction.

The arrangement of the male and female threads in the first conductive member 11*a*, the second conductive member 11*b*, and the NTC thermistor 14 is not particularly limited as long as they can fasten the first conductive member 11*a* and the second conductive member 11*b* with the NTC thermistor 14.

The first conductive member 11*a* and the second conductive member 11*b* may be engaged with each other through the NTC thermistor 14.

The materials that constitute the first conductive member 11*a* and the second conductive member 11*b* are not particularly limited, and examples include metal and the like. The material that constitutes the NTC thermistor 14 is not particularly limited, and examples include SiC, Si, and other bandgap semiconductors. Examples of the NTC thermistor 14 include a device provided with these materials in part of an insulator, and having a mechanism that senses the temperature and allows a minute current to flow.

A CTR thermistor may be used in place of the NTC thermistor 14.

The cylindrical solid battery 10 may further have, in the through hole T, a detector that detects the state of the cylindrical solid battery 10. In this case, when the detector detects the abnormal state of the cylindrical solid battery 10, a current is allowed to pass through a resistance heating element to heat the NTC thermistor 14, and the resistance of the NTC thermistor 14 is reduced to make conduction.

The detector is not particularly limited as long as it can detect the abnormal state of the cylindrical solid battery 10, and examples include a voltage sensor, a temperature sensor, a heat quantity sensor, and the like.

The electrode laminate has a sheet-like shape, and each electrode has an electrode mixture layer formed on an electrode current collector. That is, the positive electrode has a positive electrode mixture layer formed on a positive electrode current collector, and the negative electrode has a negative electrode mixture layer formed on a negative electrode current collector. The electrolyte is not particularly limited, and may be contained in, for example, a gel electrolyte layer, a solid electrolyte layer, or the like.

It is sufficient for the electrode laminate that a positive electrode and a negative electrode are laminated via an electrolyte. The electrode laminate may have a plurality of positive electrodes and/or negative electrodes. The laminated structure of the electrode laminate having a plurality of positive electrodes and/or negative electrodes is, for example, positive electrode/electrolyte/negative electrode/electrolyte/positive electrode. In this case, the electrode laminate can be produced, for example, by roll-pressing.

The cylindrical solid battery 10 further has an exterior member 15 that winds around the wound electrode group 12. The exterior member 15 has a sheet-like shape. The material that constitutes the exterior member 15 is not particularly limited as long as it has conductivity, and examples include metal and the like.

In this case, the exterior member 15 may be attached with an adhesive to the end of the wound electrode group 12 on the side not in contact with the shaft member 11, or may be an electrode current collector extending from the end of the wound electrode group 12 on the side not in contact with the shaft member 11. This improves the volume energy density of the battery module 100.

The wound electrode group 12 wound with the exterior member 15 is obtained by winding the electrode laminate and the exterior member 15 around the shaft member 11 while applying a predetermined tension. In this case, the electrode laminate and the exterior member 15 may be wound while pressing from the outside of the shaft member 11.

The cylindrical solid battery 10 further has a first lid member 16A disposed at one (upper) end in the axial direction and electrically connected to one of the positive electrode and negative electrode, and a second lid member 16B disposed at the other (lower) end in the axial direction and electrically connected to the other of the positive electrode and the negative electrode. The first lid member 16A and the second lid member 16B each have an inclined region that is substantially symmetrically inclined with respect to the shaft member 11, and have a conical outer shape. Further, a ring-shaped insulating member 17 is disposed between the exterior member 15 and the first lid member 16A. On the other hand, the first lid member 16A is electrically connected to the male thread 13A, and the second lid member 16B is electrically connected to the female thread 13B and the exterior member 15.

The inclination angle of the inclined region in the first lid member 16A and second lid member 16B with respect to the shaft member 11 is not particularly limited. The inclination angle of the inclined region in the first lid member 16A with respect to the shaft member 11 is made by the height of an extender 18A adjacent to the wound electrode group 12 on the side of the shaft member 11, and the width determined by the number of turns of the wound electrode group 12. The inclined region of the first lid member 16A has a capacity enough to contain the extender 18A.

The materials that constitute the first lid member 16A and the second lid member 16B are not particularly limited as long as they have conductivity, and examples include metal and the like. The materials that constitute the first lid member 16A and the second lid member 16B may be the same or different.

The insulating member 17 is compressed by the fastening force that fastens the male thread 13A provided at the upper end of the shaft member 11 in the axial direction, and the female thread 13B provided at the lower end of the shaft member 11 in the axial direction. As a result, the exterior member 15 and the first lid member 16A are fixed to achieve sealing. On the other hand, the contact part of the second lid member 16B with the exterior member 15 is joined by laser welding to achieve sealing and integration.

The material that constitutes the insulating member 17 is not particularly limited, and examples include polypropylene (PP), polyethylene (PE), polyethylene terephthalate (PET), polyphenylene sulfide (PPS), polytetrafluoroethylene (PTFE), PFA, and other resins.

The positive electrode current collector has an extender 18A extending from one (upper) end of the wound electrode group 12 in the axial direction, and the negative electrode current collector has an extender 18B extending from the other (lower) end of the wound electrode group 12 in the axial direction. The extender 18A of the positive electrode current collector collects current into the first lid member 16A, and the extender 18B of the negative electrode current collector collects current into the second lid member 16B.

In this case, the second lid member 16B electrically connected to the extender 18B that collects current into the exterior member 15 has a larger inclination angle of the inclined region than the first lid member 16A electrically connected to the extender 18A that collects current into the shaft member 11. This makes it easy to connect the adjacent cylindrical solid batteries 10 through the male thread 13A and female thread 13B.

The following describes a case in which the cylindrical solid batteries that constitute the battery module of the present embodiment are all-solid lithium secondary batteries.

The positive electrode current collector is not particularly limited, and examples include aluminum foil and the like.

The positive electrode mixture layer contains a positive electrode active material, and may further contain a solid electrolyte, a conductive aid, a binder, and the like.

The positive electrode active material is not particularly limited as long as it can absorb and release lithium ions, and examples include $LiCoO_2$, $Li(Ni_{5/10}Co_{2/10}Mn_{3/10})$ $O_2$, $Li(Ni_{6/10}Co_{2/10}Mn_{2/10})$ $O_2$, $Li(Ni_{8/10}Co_{1/10}Mn_{1/10})$ $O_2$, $Li(Ni_{0.8}Co_{0.15}Al_{0.05})$ $O_2$, $Li(Ni_{1/6}Co_{4/6}Mn_{1/6})$ $O_2$, $Li(Ni_{1/3}Co_{1/3}Mn_{1/3})$ $O_2$, $LiCoO_4$, $LiMn_2O_4$, $LiNiO_2$, $LiFePO_4$, lithium sulfide, sulfur, and the like.

The solid electrolyte that constitutes the solid electrolyte layer is not particularly limited as long as it is a material that can conduct lithium ions, and examples include oxide-based electrolytes, sulfide-based electrolytes, and molecular crystal electrolytes in which an electrolyte dissociates to a crystal made of organic matter.

The negative electrode mixture layer contains a negative electrode active material, and may further contain a solid electrolyte, a conductive aid, a binder, and the like.

The negative electrode active material is not particularly limited as long as it can absorb and release lithium ions, and examples include metal lithium, lithium alloys, metal oxides, metal sulfides, metal nitrides, Si, SiO, carbon materials, and the like. Examples of carbon materials include artificial graphite, natural graphite, hard carbon, soft carbon, and the like.

The negative electrode current collector is not particularly limited, and examples include copper foil and the like.

The embodiment of the present invention has been described above; however, the present invention is not limited to the above embodiment. The embodiment may be modified, as appropriate, within the spirit of the present invention.

EXPLANATION OF REFERENCE NUMERALS

10 Cylindrical solid battery
11 Shaft member

11*a* First conductive member
11*b* Second conductive member
12 Wound electrode group
13A Male thread
13B Female thread
14 NTC thermistor
15 Exterior member
16A First lid member
16B Second lid member
17 Insulating member
18A, 18B Extender
100 Battery module
T Through hole

What is claimed is:

1. A battery module comprising a plurality of cylindrical solid batteries,
   each cylindrical solid battery having a shaft member, and
      a wound electrode group in which an electrode laminate of a positive electrode and a negative electrode laminated via an electrolyte is wound around the shaft member,
   the shaft member being provided with an NTC thermistor or a CTR thermistor in an axial direction between a first conductive member and a second conductive member, and having a through hole in its center,
   the first conductive member being provided with a male thread at one end of the shaft member in the axial direction,
   the second conductive member being provided with a female thread at the other end of the shaft member in the axial direction,
   adjacent cylindrical solid batteries being fastened through the male thread and the female thread,
   the NTC thermistor or the CTR thermistor being fastened with the first conductive member and the second conductive member, and
   each cylindrical solid battery further having a temperature controller that is disposed in the through hole and controls the temperature of the NTC thermistor or CTR thermistor.

2. The battery module according to claim 1, wherein each cylindrical solid battery further has, in the through hole, a detector that detects the state of the cylindrical solid battery.

3. The battery module according to claim 1, wherein in the electrode laminate, the positive electrode and the negative electrode are laminated via a solid electrolyte layer.

* * * * *